United States Patent
Li

(10) Patent No.: US 9,536,317 B2
(45) Date of Patent: Jan. 3, 2017

(54) REGION SEGMENTATION APPARATUS, RECORDING MEDIUM AND METHOD

(71) Applicant: FUJIFILM Corporation, Tokyo (JP)

(72) Inventor: Yuanzhong Li, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/799,590

(22) Filed: Jul. 15, 2015

(65) Prior Publication Data
US 2015/0317798 A1 Nov. 5, 2015

Related U.S. Application Data

(63) Continuation of application No. PCT/JP2014/000077, filed on Jan. 10, 2014.

(30) Foreign Application Priority Data

Jan. 17, 2013 (JP) .................................. 2013-006539

(51) Int. Cl.
G06K 9/00 (2006.01)
G06T 7/00 (2006.01)

(52) U.S. Cl.
CPC ........... *G06T 7/0081* (2013.01); *G06T 7/0012* (2013.01); *G06T 7/0093* (2013.01);
(Continued)

(58) Field of Classification Search
CPC ................... G06T 7/0093; G06T 2207/20072; G06K 9/6224
See application file for complete search history.

(56) References Cited

U.S. PATENT DOCUMENTS 7,212,201 B1 5/2007 Geiger et al.
8,441,481 B2 5/2013 Geiger et al.
(Continued)

FOREIGN PATENT DOCUMENTS

JP 2009-211138 9/2009
JP 2010-205067 9/2010
(Continued)

OTHER PUBLICATIONS

Arvind Bhusnurmath et al. "Graph Cuts via l1 Norm Minimization", Oct. 2008, IEEE Transactions on Pattern Analysis and Machine Intelligence, vol. 30 No. 10, p. 1866-1871.*
(Continued)

*Primary Examiner* — Gandhi Thirugnanam
(74) *Attorney, Agent, or Firm* — Jianq Chyun IP Office

(57) ABSTRACT

A candidate-region for an object-region is set in an image. In a graph including point-S corresponding the object-region, point-T corresponding to a background-region, a point corresponding to each pixel in the image, S-link connecting each pixel and point-S, T-link connecting each pixel and point-T, and N-link connecting each pair of adjacent pixels, a cost is set for each link, graph-cut is performed. Whether a pixel connected to point-S by a link is present in the graph is judged. If no pixel is present, graph-cut is performed at each stage while costs set for all the S-links connecting each pixel in the candidate-region and point-S are increased stepwise in an increment of a predetermined threshold or less until a pixel connected to point-S by a link appears. Whether each pixel in the image belongs to the object-region or the background-region is determined based on a result of graph-cut performed last.

21 Claims, 4 Drawing Sheets

(52) U.S. Cl.
CPC  *G06T 2200/04* (2013.01); *G06T 2207/10081* (2013.01); *G06T 2207/10088* (2013.01); *G06T 2207/20072* (2013.01); *G06T 2207/20148* (2013.01); *G06T 2207/30016* (2013.01)

(56) References Cited

U.S. PATENT DOCUMENTS

| | | | | |
|---|---|---|---|---|
| 2002/0048401 | A1* | 4/2002 | Boykov | G06K 9/342 |
| | | | | 382/173 |
| 2005/0117801 | A1* | 6/2005 | Davis | G06K 9/469 |
| | | | | 382/173 |
| 2005/0134587 | A1 | 6/2005 | Geiger et al. | |
| 2007/0058865 | A1 | 3/2007 | Li et al. | |
| 2007/0292025 | A1* | 12/2007 | Boykov | G06K 9/342 |
| | | | | 382/173 |
| 2008/0030497 | A1* | 2/2008 | Hu | G06K 9/342 |
| | | | | 345/419 |
| 2008/0044080 | A1* | 2/2008 | Li | G06K 9/34 |
| | | | | 382/155 |
| 2008/0247619 | A1* | 10/2008 | Li | G06T 7/0012 |
| | | | | 382/128 |
| 2008/0317308 | A1 | 12/2008 | Wu et al. | |
| 2009/0136103 | A1* | 5/2009 | Sonka | G06K 9/4638 |
| | | | | 382/128 |
| 2010/0226574 | A1 | 9/2010 | Omori | |
| 2011/0109626 | A1* | 5/2011 | Geiger | G06K 9/342 |
| | | | | 345/419 |
| 2011/0222748 | A1* | 9/2011 | Kitamura | G06T 7/0085 |
| | | | | 382/128 |
| 2011/0273592 | A1 | 11/2011 | Yamaoka et al. | |
| 2012/0237122 | A1* | 9/2012 | Hirota | G06T 7/0083 |
| | | | | 382/164 |
| 2012/0288199 | A1* | 11/2012 | Kanda | G06T 7/0083 |
| | | | | 382/173 |
| 2013/0223741 | A1 | 8/2013 | Geiger et al. | |
| 2015/0193943 | A1* | 7/2015 | Li | G06T 7/0081 |
| | | | | 382/131 |
| 2015/0199586 | A1* | 7/2015 | Li | G06T 7/0081 |
| | | | | 382/131 |
| 2015/0199587 | A1* | 7/2015 | Li | G06T 7/0012 |
| | | | | 382/131 |
| 2015/0317798 | A1* | 11/2015 | Li | G06T 7/0081 |
| | | | | 382/131 |

FOREIGN PATENT DOCUMENTS

| | | |
|---|---|---|
| JP | 2011-237907 | 11/2011 |
| JP | 2012-192051 | 10/2012 |

OTHER PUBLICATIONS

Y.Y. Boykov and M.P. Jolly, "Interactive Graph Cuts for Optimal Boundary & Region Segmentation of Objects in N-D Images", Proceedings of "International Conference on Computer Vision", vol. I, pp. 105-112, Vancouver, Canada, Jul. 2001.

Y. Okuda et al., "A Graph Cut Image Segmentation Based on Quadtree Representation", IEICE Transactions on Information and Systems, vol. J91-D, No. 10, pp. 2540-2549, Oct. 1, 2008.

* cited by examiner

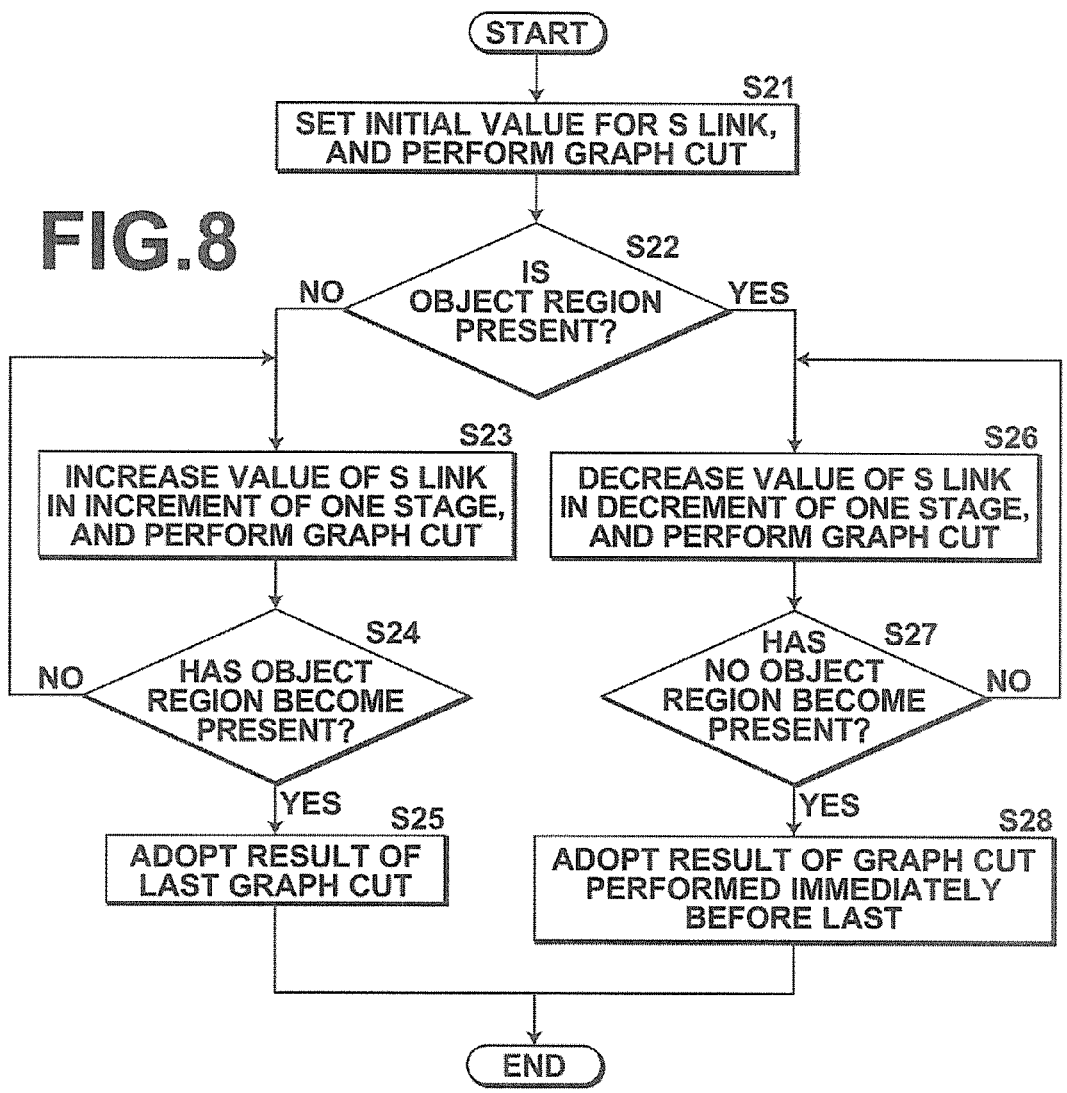

REGION SEGMENTATION APPARATUS, RECORDING MEDIUM AND METHOD

CROSS-REFERENCE TO RELATED APPLICATIONS

This application is a Continuation of PCT International Application No. PCT/JP2014/000077 filed on Jan. 10, 2014, which claims priority under 35 U.S.C. §119(a) to Japanese Patent Application No. 2013-006539 filed on Jan. 17, 2013. Each of the above applications is hereby expressly incorporated by reference, in its entirety, into the present application.

BACKGROUND OF THE INVENTION

1. Field of the Invention

The present invention relates to a region segmentation apparatus, computer program and method for dividing an image into an object region and the other region by using a graph cut technique.

2. Description of the Related Art

Conventionally, graph cut was known as a method for dividing an image into an object region and the other region. As one of region segmentation methods by graph cut, Japanese Unexamined Patent Publication No. 2010-205067 (Patent Document 1) proposes setting plural different tentative initial regions in an image, creating probability distribution models of pixel values in the inside and the outside of each of the tentative initial regions, setting, as an initial region, a tentative initial region having a highest degree of separation between the probability distribution model of the inside and the probability distribution model of the outside, and performing region segmentation processing by graph cut by using the set initial region.

Further, Y. Y. Boykov and M. P. Jolly, "Interactive Graph Cuts for Optimal Boundary & Region Segmentation of Objects in N-D Images", Proceedings of "International Conference on Computer Vision", Vol. I, pp. 105-112, 2001 (Non-Patent Document 1) proposes a method for dividing an image into an object region and a background region by using a probability that each pixel represents the object region or the background region, which has been calculated based on information about a pixel representing the object region in the image and a pixel representing the background region in the image, and the information having been given by a user.

SUMMARY OF THE INVENTION

However, the region segmentation method of Patent Document 1 distinguishes an object region and the other region from each other mainly based on a difference in a probability distribution of pixel values. Therefore, a part of a background region having a probability distribution of pixel values similar to that of the object region is erroneously separated, as the object region, in some cases, and that causes a problem. For example, when CT image P2 of head, which is schematically illustrated in FIG. 3, is divided into brain region A2 and the other region, spine region B2, which is a narrow long region that is connected to the brain region and extends downward, is erroneously separated, as a part of the brain region, in some cases.

Further, the region segmentation method of Non-Patent Document 1 requires complicated operations of manually providing information about a pixel representing an object region in an image and a pixel representing a background region in the image by a user. Therefore, the complexity needs to be improved.

In view of the foregoing circumstances, it is an object of the present invention to provide a region segmentation apparatus, computer program and method that can prevent a part of a background region having a probability distribution of pixel (or voxel, hereinafter) values similar to that of an object region from being erroneously separated as the object region when an image is divided into the object region and the other region by using a graph cut technique, and that can automatically separate the object region in a more accurate manner. The present invention deals a wide thick region, as an object region, and a narrow long region, as a part of a background region having a probability distribution of pixel values similar to that of the object region.

A first region segmentation apparatus of the present invention is a region segmentation apparatus that divides an image into an object region and a region other than the object region. The apparatus includes a candidate region setting unit that sets a candidate region for the object region in the image, and a region segmentation unit that sets a cost for each of an S link, a T link and an N link in a graph including point S corresponding the object region, point T corresponding to the region other than the object region, a point corresponding to each of pixels in the image, the S link connecting a point corresponding to each of the pixels in the image and point S to each other, the T link connecting a point corresponding to each of the pixels in the image and the point T to each other, and the N link connecting two points corresponding to each pair of adjacent pixels to each other, and performs a graph cut that minimizes the sum of costs set for links to be cut, and judges whether a point corresponding to one of the pixels connected to point S by a link is present in the graph after performance of graph cut, and if no point is present, performs the graph cut at each stage while costs set for all the S links connecting points corresponding to pixels in the candidate region set by the candidate region setting unit and point S to each other are increased stepwise in an increment of less than or equal to a predetermined threshold until a point corresponding to one of the pixels connected to point S by a link appears, and determines whether each of the pixels in the image belongs to the object region or the region other than the object region based on a result of the graph cut performed last.

A second region segmentation apparatus of the present invention is a region segmentation apparatus that divides an image into an object region and a region other than the object region. The apparatus includes a candidate region setting unit that sets a candidate region for the object region in the image, and a region segmentation unit that sets a cost for each of an S link, a T link and an N link in a graph including point S corresponding the object region, point T corresponding to the region other than the object region, a point corresponding to each of pixels in the image, the S link connecting a point corresponding to each of the pixels in the image and point S to each other, the T link connecting a point corresponding to each of the pixels in the image and the point T to each other, and the N link connecting two points corresponding to each pair of adjacent pixels to each other, and performs a graph cut that minimizes the sum of costs set for links to be cut, and judges whether a point corresponding to one of the pixels connected to point S by a link is present in the graph after performance of graph cut, and if the point is present, performs the graph cut at each stage while costs set for all the S links connecting points corresponding to pixels in the candidate region set by the candidate region setting unit and point S to each other are decreased stepwise in a decrement of less than or equal to a predetermined threshold until each point corresponding to the pixels connected to point S by links disappears, and determines whether each of the pixels in the image belongs to the object region or the region other than the object region based on a result of a graph cut performed immediately before the graph cut performed last.

A third region segmentation apparatus of the present invention is a region segmentation apparatus that divides an image into an object region and a region other than the object region. The apparatus includes a candidate region setting unit that sets a candidate region for the object region in the image, and a region segmentation unit that sets a cost for each of an S link, a T link and an N link in a graph including point S corresponding the object region, point T corresponding to the region other than the object region, a point corresponding to each of pixels in the image, the S link connecting a point corresponding to each of the pixels in the image and point S to each other, the T link connecting a point corresponding to each of the pixels in the image and the point T to each other, and the N link connecting two points corresponding to each pair of adjacent pixels to each other, and performs a graph cut that minimizes the sum of costs set for links to be cut, and judges whether a point corresponding to one of the pixels connected to point S by a link is present in the graph after performance of graph cut, and if the judgment judges that no point corresponding to one of the pixels connected to point S by a link is present, performs the graph cut at each stage while costs set for all the S links connecting points corresponding to pixels in the candidate region set by the candidate region setting unit and point S to each other are increased stepwise in an increment of less than or equal to a predetermined threshold until a point corresponding to one of the pixels connected to point S by a link appears, and determines whether each of the pixels in the image belongs to the object region or the region other than the object region based on a result of the graph cut performed last, but if the judgment judges that the point corresponding to one of the pixels connected to point S by a link is present, performs the graph cut at each stage while costs set for all the S links connecting points corresponding to pixels in the candidate region and point S to each other are decreased stepwise in a decrement of less than or equal to a predetermined threshold until each point corresponding to the pixels connected to point S by links disappears, and determines whether each of the pixels in the image belongs to the object region or the region other than the object region based on a result of a graph cut performed immediately before the graph cut performed last.

In the first, second and third region segmentation apparatuses, the candidate region setting unit may obtain a distribution of pixel values for the whole image or a part of the image including the object region, and determine a range of pixel values by analyzing the obtained distribution of pixel values, and set, as the candidate region, a set of pixels having pixel values within the determined range of pixel values.

The first, second and third region segmentation apparatuses may include a pixel value range storage unit that stores a predetermined range of pixel values, and the candidate region setting unit may set, as the candidate region, a set of pixels having pixel values within the range of pixel values stored in the pixel value range storage unit.

Each of the first, second and third region segmentation apparatuses may include a set value storage unit that stores a predetermined set value of cost, and the region segmentation unit may use the set value stored in the set value storage unit, as an initial value of cost that is set for all the S links connecting points corresponding to pixels in the candidate region and point S to each other. Here, the region segmentation unit may receive an input of a set value of cost by a user, and use the input set value, as an initial value of cost that is set for all the S links connecting points corresponding to pixels in the candidate region and point S to each other.

Each of the first, second and third region segmentation apparatuses may include a threshold storage unit that stores a predetermined threshold, and the region segmentation unit may determine the value of increment or decrement by using the threshold stored in the threshold storage unit. The region segmentation unit may receive an input of a threshold by a user, and determine the value of increment or decrement by using the received threshold. At this time, the value of increment to increase a value for one S link stepwise may be a constant value of increment. Alternatively, the value of increment may be different at each stage. Further, the value of increment to increase values for S links at each stage may be the same for all the S links. Alternatively, the value of increment for each link may be slightly different from each other.

Each of first, second and third region segmentation programs of the present invention is loaded in one or plural computers. When the programs are executed, the computer or computers function as the candidate region setting unit, the region segmentation mean and the like of the first, second and third region segmentation apparatuses. Each of the programs includes plural program modules, and processing by each of the aforementioned unit is performed by one or plural program modules. These program module groups are recorded in a recording medium, such as a CD-ROM and DVD, or stored in a storage attached to a server computer or a network storage in a downloadable manner, and provided for users.

Each of first, second and third region segmentation methods of the present invention causes one or plural computers to perform a candidate region setting step by the candidate region setting unit of the first, second and third region segmentation apparatuses and a region segmentation step by the region segmentation mean of the first, second and third region segmentation apparatuses.

In each of the region segmentation apparatuses, programs and methods, the image may be a two-dimensional image. Alternatively, the image may be a three-dimensional image.

In the first region segmentation apparatus, program and method of the present invention, a candidate region for the object region is set in an image. Further, a cost for each of an S link, a T link and an N link is set in a graph including point S corresponding the object region, point T corresponding to the region other than the object region, a point corresponding to each of pixels in the image, the S link connecting a point corresponding to each of the pixels in the image and point S to each other, the T link connecting a point corresponding to each of the pixels in the image and the point T to each other, and the N link connecting two points corresponding to each pair of adjacent pixels to each other. A graph cut that minimizes the sum of costs set for links to be cut is performed, and judgement is made as to whether a point corresponding to one of the pixels connected to point S by a link is present in the graph after performance of graph cut. If no point is present, graph cut is performed at each stage while costs set for all the S links connecting points corresponding to pixels in the candidate region and point S to each other are increased stepwise in an increment of less than or equal to a predetermined threshold until a point corresponding to one of the pixels connected to point S by a link appears, and determination is made as to whether each of the pixels in the image belongs to the object region or the region other than the object region based on a result of the graph cut performed last. Accordingly, it is possible to prevent a part of a background region having a probability distribution of pixel values similar to that of an object region from being erroneously separated as the object region when an image is divided into the object region and the other region, and to automatically separate the object region in a more accurate manner. For example, when region segmentation is performed on CT image P2 of head, which is schematically illustrated in FIG. 3, to separate brain region A2, as an object region, it is possible to prevent a background region, such as spine region B2, from being erroneously separated as the brain region, and to automatically separate the object region in a more accurate manner. Next, a mechanism for achieving these effects by the present invention will be described.

For example, wide thick region A1 and narrow long region B1, which are surrounded by pixels (outlined dots) that are known to be a background, are considered in image P1 illustrated in FIG. 2. At this time, a cost (the value of N link) set for N links connecting regions A1 and B1 to surrounding pixels adjacent to regions A1 and B1 is assumed to be 1. Although a T link connecting a pixel and point T to each other is set for each of pixels that are known to be the background, a part of the T links are appropriately omitted in FIG. 2 to facilitate understanding. As illustrated in FIG. 2, the number of S links connecting region A1 and point S is 4, and the number of N links connecting region A1 to surrounding pixels adjacent to region A1 is 8. Therefore, when a value that is less than 2 is set as the value of the S link, the sum of the values of S links in region A1 is less than the sum of the values of N links connecting region A1 to surrounding pixels adjacent to region A1. Hence, as a result of graph cut, region A1 is classified as a background region. When a value that is greater than 2 is set as the value of an S link, the sum of the values of S links in region A1 is greater than the sum of the values of N links connecting region A1 to surrounding pixels adjacent to region A1. Hence, as a result of graph cut, region A1 is classified as an object region.

Meanwhile, as illustrated in FIG. 2, the number of S links connecting region B1 to point S is 4, which is the same number as that of region A1. However, the number of N links connecting region B1 to surrounding pixels adjacent to region B1 is 10, which is a larger number than that of region A1. Therefore, regarding region B1, not only when a value that is less than 2 is set as the value of an S link but also when a value that is greater than 2 and less than 2.5 is set as the value of an S link, the sum of the values of S links in region B1 is less than the sum of the values of N links connecting region B1 to surrounding pixels adjacent to region B1. Hence, as a result of graph cut, region B1 is classified as a background region. When a value that is greater than 2.5 is set as the value of an S link, the sum of the values of S links in region B1 becomes greater than the sum of the values of N links connecting region B1 to surrounding pixels adjacent to region B1 for the first time. As a result of graph cut, region B1 is classified as an object region.

As described, the ratio of the number of N links connecting a wide thick region to surrounding pixels adjacent to the region to the number of S links connecting the region to point S is less than that of a narrow long region. Therefore, the wide thick region tends to be classified as an object region even when a smaller value of S link is set, compared with the narrow long region. The first region segmentation apparatus, program and method of the present invention paid attention to such characteristics of region segmentation. For example, in the case illustrated in FIG. 2, 1.5 is set as the initial value of the value of an S link, and graph cut is performed at each stage while the value of the S link is increased stepwise in an increment of 0.2 (1.5→1.7→ . . . ). Processing ends at a stage when an object region has appeared, in other words, at a stage when 2.1 is set as the value of the S link and only thick region A1 has appeared as the object region, and a result of graph cut obtained at this time is adopted.

In the second region segmentation apparatus, program and method of the present invention, a candidate region for the object region is set in an image. Further, a cost for each of an S link, a T link and an N link is set in a graph including point S corresponding the object region, point T corresponding to the region other than the object region, a point corresponding to each of pixels in the image, the S link connecting a point corresponding to each of the pixels in the image and point S to each other, the T link connecting a point corresponding to each of the pixels in the image and the point T to each other, and the N link connecting two points corresponding to each pair of adjacent pixels to each other. A graph cut that minimizes the sum of costs set for links to be cut is performed, and judgement is made as to whether a point corresponding to one of the pixels connected to point S by a link is present in the graph after performance of graph cut. If the point is present, the graph cut is performed at each stage while costs set for all the S links connecting points corresponding to pixels in the candidate region and point S to each other are decreased stepwise in a decrement of less than or equal to a predetermined threshold until each point corresponding to the pixels connected to point S by links disappears, and determination is made as to whether each of the pixels in the image belongs to the object region or the region other than the object region based on a result of a graph cut performed immediately before the graph cut performed last. Accordingly, it is possible to prevent a part of a background region having a probability distribution of pixel values similar to that of an object region from being erroneously separated as the object region when an image is divided into the object region and the other region, and to automatically separate the object region in a more accurate manner. For example, when region segmentation is performed on a CT image of head to separate the brain region, as an object region, it is possible to prevent a background region, such as the spine region, from being erroneously separated as the brain region, and to automatically separate the object region in a more accurate manner.

This is achievable by a mechanism similar to that of the first region segmentation apparatus, program and method. For example, in the case illustrated in FIG. 2, the second region segmentation apparatus, program and method of the present invention sets 2.5, as the initial value of the value of an S link, and performs graph cut at each stage while the value of the S link is decreased stepwise in a decrement of 0.2 (2.5→2.3 . . . ). Processing ends at a stage when the object region has disappeared for the first time, in other words, at a stage when 1.9 is set as the value of the S link, and a result of graph cut obtained at a stage immediately before this stage, in other words, at a stage when 2.1 was set as the value of the S link is adopted.

In the third region segmentation apparatus, program and method of the present invention, a candidate region for the object region is set in an image. Further, a cost for each of an S link, a T link and an N link is set in a graph including point S corresponding the object region, point T corresponding to the region other than the object region, a point corresponding to each of pixels in the image, the S link connecting a point corresponding to each of the pixels in the image and point S to each other, the T link connecting a point corresponding to each of the pixels in the image and the point T to each other, and the N link connecting two points corresponding to each pair of adjacent pixels to each other. A graph cut that minimizes the sum of costs set for links to be cut is performed, and judgement is made as to whether a point corresponding to one of the pixels connected to point S by a link is present in the graph after performance of graph cut. If the judgment judges that no point corresponding to one of the pixels connected to point S by a link is present, the graph cut is performed at each stage while costs set for all the S links connecting points corresponding to pixels in the candidate region and point S to each other are increased stepwise in an increment of less than or equal to a predetermined threshold until a point corresponding to one of the pixels connected to point S by a link appears, and determination is made as to whether each of the pixels in the image belongs to the object region or the region other than the object region based on a result of the graph cut performed last. However, if the judgment judges that the point corresponding to one of the pixels connected to point S by a link is present, the graph cut is performed at each stage while costs set for all the S links connecting points corresponding to pixels in the candidate region and point S to each other are decreased stepwise in a decrement of less than or equal to a predetermined threshold until each point corresponding to the pixels connected to point S by links disappears, and determination is made as to whether each of the pixels in the image belongs to the object region or the region other than the object region based on a result of a graph cut performed immediately before the graph cut performed last. Accordingly, it is possible to prevent a part of a background region having a probability distribution of pixel values similar to that of an object region from being erroneously separated as the object region when an image is divided into the object region and the other region by using a graph cut technique, and to automatically separate the object region in a more accurate manner. For example, when region segmentation is performed on a CT image of head to separate the brain region, as an object region, it is possible to prevent a background region, such as the spine region, from being erroneously separated as the brain region, and to automatically separate the object region in a more accurate manner.

This is achievable by a mechanism similar to that of the first region segmentation apparatus, program and method. For example, in the case illustrated in FIG. 2, the third region segmentation apparatus, program and method of the present invention performs graph cut at each stage while the value of the S link is increased stepwise in an increment of 0.2 (1.5→1.7→ . . . ) when 1.5 is set as the initial value of the value of the S link. Processing ends at a stage when an object region has appeared, in other words, at a stage when 2.1 is set as the value of the S link and only thick region A1 has appeared as the object region, and a result of graph cut obtained at this time is adopted. The third region segmentation apparatus, program and method of the present invention performs graph cut at each stage while the value of the S link is decreased stepwise in a decrement of 0.2 (2.5→ 2.3 . . . ) when 2.5 is set as the initial value of the value of an S link. Processing ends at a stage when the object region has disappeared for the first time, in other words, at a stage when 1.9 is set as the value of the S link, and a result of graph cut obtained at a stage immediately before this stage, in other words, at a stage when 2.1 was set as the value of the S link is adopted.

BRIEF DESCRIPTION OF THE DRAWINGS

FIG. 8 is a flowchart showing a flow of region segmentation processing in a third embodiment.

DESCRIPTION OF THE PREFERRED EMBODIMENTS

Hereinafter, embodiments of a region segmentation apparatus, program and method of the present invention will be described with reference to drawings. In the following embodiments, the region segmentation apparatus is a computer or computers in which the region segmentation program has been installed. The region segmentation program is stored in a recording medium, such as a DVD and a CD-ROM, and distributed, and installed in a computer from the recording medium. Alternatively, the region segmentation program is stored in a storage of a server computer connected to a network or in a network storage in an accessible manner from the outside, and installed in a computer used by a doctor by being downloaded based on a request. Here, this embodiment corresponds to the first region segmentation apparatus, program and method of the present invention.

Figure 1:
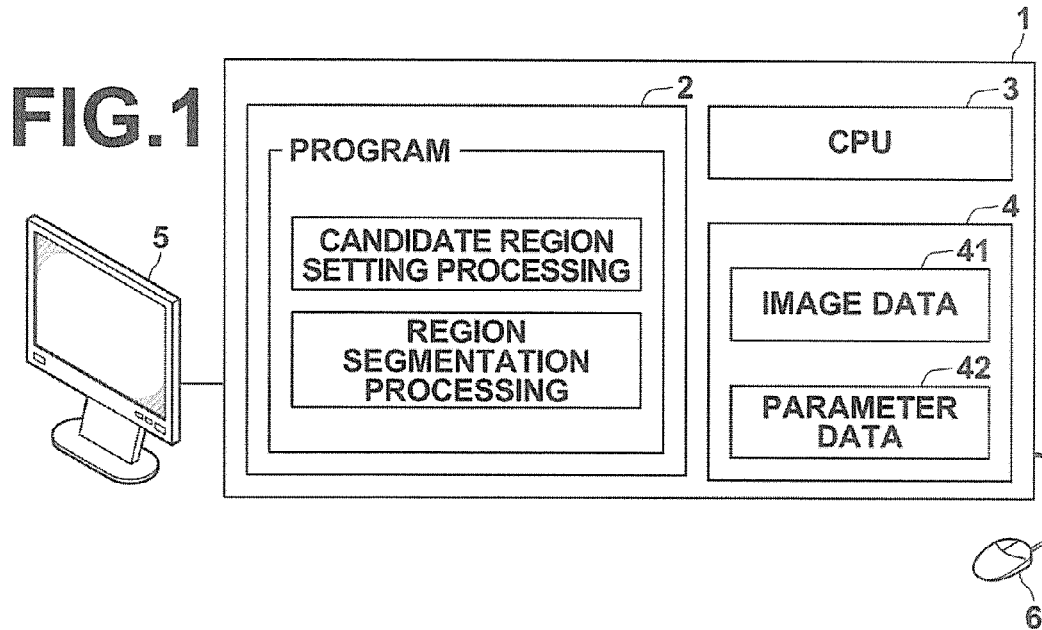
FIG. 1 is a schematic diagram illustrating the configuration of a region segmentation apparatus according to an embodiment of the present invention.
Figure 2:
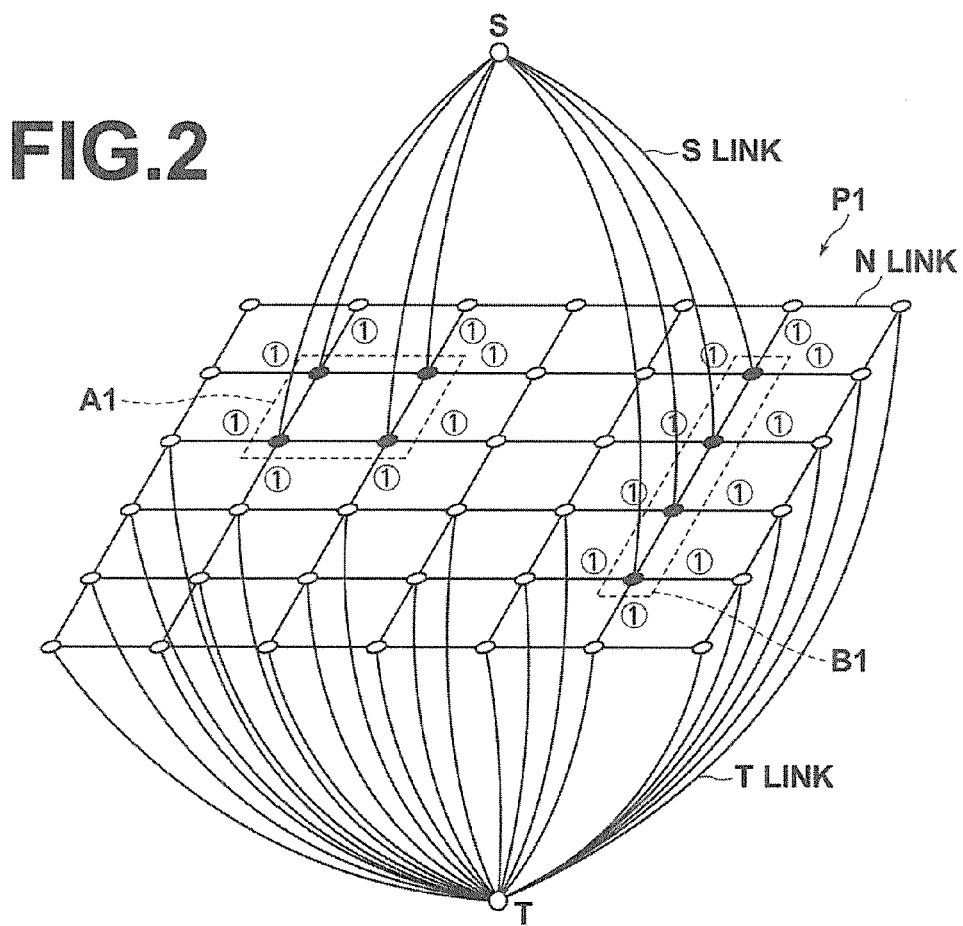
FIG. 2 is a diagram for explaining a mechanism for solving a problem by the present invention.

FIG. 1 is a schematic diagram illustrating the configuration of a region segmentation apparatus 1 realized by installing the region segmentation program in a computer. As illustrated in FIG. 1, the region segmentation apparatus 1 includes a memory 2, a CPU 3 and a storage 4. Further, a display 5 and an input device, such as a mouse 6, are connected to the region segmentation apparatus 1.

Two-dimensional or three-dimensional image data 41 obtained by imaging a subject to be examined are stored in the storage 4. For example, slice data output by an imaging apparatus, such as a CT apparatus and an MRI apparatus, volume data reconstructed from many sets of slice data output by an imaging apparatus, and the like are stored.

Further, parameter data 42, such as range Rs of pixel values that has been determined in advance to set a candidate region and set value K and threshold Th that have been determined in advance to set the value of an S link, are stored in the storage 4 (a pixel value range storage unit, a set value storage unit and a threshold storage unit). At this time, for example, a range of pixel values to which the pixel values of at least 70% or more of pixels constituting an object region belong, or preferably to which the pixel values of 80% or more of pixels constituting the object region belong, or more preferably to which the pixel values of 90% or more of pixels constituting the object region belong may be obtained in each of plural cases in which a similar image is divided into an object region and a region other the object region. A range of pixel values having, as its lower limit value, the lowest one of the lower limit values of the obtained ranges of the pixel values and, as its higher limit value, the highest one of the higher limit values of the obtained ranges of the pixel values may be stored, as range Rs of pixel values.

Further, for example, graph cut may be performed at each stage in each of plural cases i (i=1, 2, . . . ) in which a similar image is divided into a similar object region and a region other the object region while the value of S link is increased stepwise in a small increment by using, as an initial value, a value that is small enough to avoid extraction of the object region. Then, value ka(i) of S link when an object region has appeared may be obtained in each of plural cases i, and the lowest value of the values ka(i) of S link may be stored, as set value K of cost.

Figure 3:
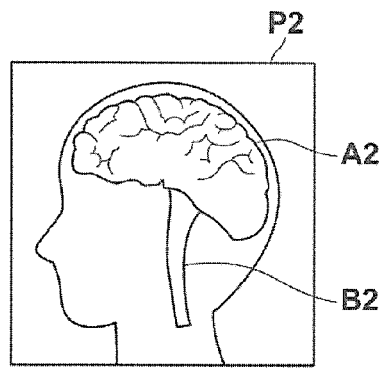
FIG. 3 is a diagram illustrating an example of an image to be divided.
Figure 4:
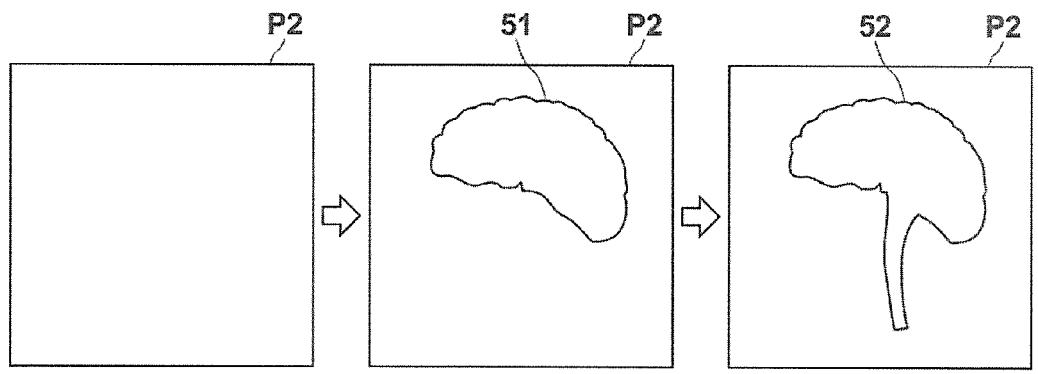
FIG. 4 is a diagram for explaining a method for determining a set value of cost and a threshold for setting the value of an S link.

For example, when region segmentation is performed on CT image P2 of head, which is schematically illustrated in FIG. 3, to separate brain region A1, as an object region, graph cut may be performed at each stage in each of plural cases (for example, about 10 cases) in which a CT image of head is divided into a brain region and a region other the brain region while the value of S link is increased stepwise. Then, the value of S link when the result of graph cut changes from a result illustrated in a left diagram of FIG. 4 to a result illustrated in a center diagram of FIG. 4 is obtained in each of the plural cases, and the lowest value of the obtained values of S link may be stored, as set value K of cost.

Further, for example, in each of the plural cases i, graph cut may be performed at each stage of increase while a value of S link in a candidate region for an object region is further increased after exceeding value ka(i) of S link. Then, value kb(i) of S link when at least a part of a background region has begun to appear by being erroneously separated, as an object region, may be obtained, and increase $\Delta k(i)$ from value ka(i) of S link to value kb(i) of S link may be obtained in each of the plural cases i. The lowest value of the values of increase $\Delta k(i)$ may be stored, as threshold Th.

For example, when region segmentation is performed on CT image P2 of head, which is illustrated in FIG. 3, to separate brain region A1, as an object region, graph cut may be performed at each stage in each of plural cases (for example, about 10 cases) in which a CT image of head is divided into a brain region and a region other the brain region while the value of S link is increased stepwise. Then, an increase in the value of S link from the value of S link when the result of graph cut changes from the result illustrated in the left diagram of FIG. 4 to the result illustrated in the center diagram of FIG. 4 to the value of S link when the result of graph cut changes from the result illustrated in the center diagram of FIG. 4 to a result illustrated in a right diagram of FIG. 4 may be obtained in each of the plural cases. Further, the lowest value of the obtained values of increase may be stored, as set value K of cost.

Further, a region segmentation program has been stored in the memory 2. The region segmentation program defines candidate region setting procession, region segmentation processing and the like, as processing to be performed by the CPU 3. When the CPU 3 performs these kinds of processing based on the program, the computer functions as a candidate region setting unit, a region segmentation unit and the like.

Next, specific processing performed by the region segmentation apparatus 1 will be described. The region segmentation apparatus 1 receives an input by a user at a selection menu that gives an instruction of region segmentation by specifying an image (hereinafter, referred to as "an image to be divided") on which region segmentation is performed. Then, the region segmentation apparatus 1 obtains image data of the image to be divided from the storage 4.

Figure 5:
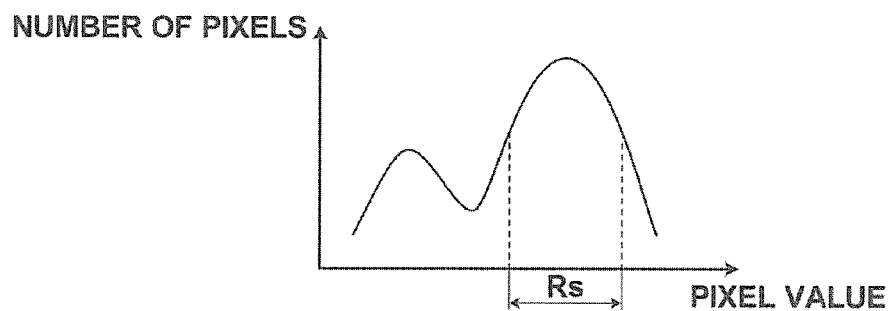
FIG. 5 is a diagram for explaining candidate region setting processing using a histogram.

Next, the region segmentation apparatus 1 performs candidate region setting processing to set a candidate region for an object region in the image to be divided. Specifically, a set of pixels having pixel values within range Rs of pixel values stored in the storage 4 is set as the candidate region. Here, the region segmentation apparatus 1 may set the candidate region in the following manner, instead of setting the set of pixels having pixel values within range Rs of pixel values stored in the storage 4, as the candidate region. For example, the region segmentation apparatus 1 may set the set of pixels having pixel values within range Rs of pixels, as the candidate region, by creating a histogram (a graph representing the distribution of pixel values) of the whole image to be divided or a part of the image including an object region, as illustrated in FIG. 5, and by determining range Rs of pixel values by analyzing the created histogram. At this time, the range of pixel values may be determined by learning, in advance, histograms about a whole image or a part of the image including an object region for plural similar images in which the object region is known, and by generating an algorithm that can judge, based on a histogram of the whole image of an arbitrary image to be divided or a part of the image including an object region, a range of pixel values to which the pixel values of at least 70% or more of pixels constituting an object region belong, or preferably to which the pixel values of 80% or more of pixels constituting the object region belong, or more preferably to which the pixel values of 90% or more of pixels constituting the object region belong, and by applying the algorithm to a histogram of the whole image to be divided or a part of the image including an object region in the embodiment of the present invention.

The former, in which a set of pixels having pixel values within range Rs of pixel values stored in the storage 4 is set, as a candidate region, is effective especially when an image to be divided is a CT (Computed Tomography) image. The latter, in which range Rs of pixel values is determined by analyzing the distribution of pixel values for the whole image to be divided or a part of the image including an object region and a set of pixels having pixel values within the range Rs is set as a candidate region, is appropriate especially when the image to be divided is an MRI (magnetic resonance imaging) image. Therefore, the method for setting a candidate region for an object region may be provided in such a manner to be settable by being selected from the aforementioned methods based on the kind of an image to be divided.

Figure 6:
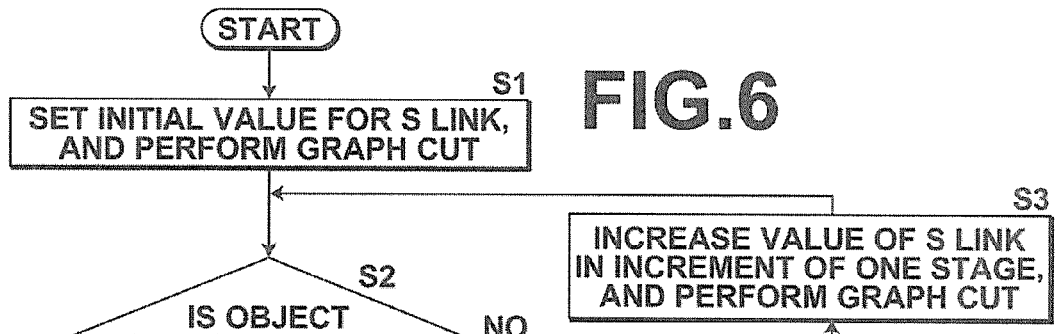
FIG. 6 is a flowchart showing a flow of region segmentation processing in a first embodiment.

Next, the region segmentation method 1 performs region segmentation processing for determining whether each of the pixels in the image to be divided belongs to the object region or the region other than the object region by using a graph cut technique. FIG. 6 is a flowchart illustrating the outline of region segmentation processing.

In this segmentation processing, first, a graph including point S corresponding to the object region, point T corresponding to the region other than the object region, a point corresponding to each of pixels in the image to be divided, an S link connecting a point corresponding to each of the pixels in the image to be divided and point S to each other, a T link connecting a point corresponding to each of the pixels in the image to be divided and point T to each other, and an N link connecting two points corresponding to each pair of adjacent pixels to each other is generated. Then, a cost is set for each of the S link, T link and N link, and graph cut is performed in such a manner to minimize the sum of costs set for links to be cut (step S1). At this time, set value K of cost stored in the storage 4 is set, as the initial value for all of S links connecting each of pixels in the candidate region set by the aforementioned candidate region setting processing and point S to each other, and a value of cost smaller than set value K is set, as the initial value for the other S links.

Further, a greater value of cost is set for a T link as the probability that the pixel of the T link belongs to a background region is higher. For example, a histogram of the whole image to be divided or a part of the image including the object region is created, and a range of pixel values estimated to include pixel values of many pixels of the background region is specified by analyzing the created histogram. Further, a great value of cost is set for all of T links connecting each pixel having a pixel value within the range and point T to each other, and a value of cost smaller than that value is set for the other T links. Further, a greater value of cost is set for N link as the probability that a pair of two adjacent pixels belongs the same region is higher (in other words, the probability that a pair of two adjacent pixels belongs to different regions is lower). For example, a greater value of cost is set as a difference in pixel values becomes smaller.

Then, the region segmentation apparatus 1 judges whether a point corresponding to a pixel connected to point S by a link is present in the graph after performance of graph cut (step S2). Here, if the judgment judges that a point corresponding to a pixel connected to point S by a link is present (step S2: YES), graph cut processing ends there. Then, whether each pixel in the image to be divided belongs to the object region or the region other than the object region is determined based on the result of performed graph cut (step S4).

In contrast, if the judgment judges that no point corresponding to a pixel connected to point S by a link is present in step S2 (step S2: NO), graph cut is repeated while a cost that is set for all of S links connecting each point corresponding to each of pixels in the candidate region and point S to each other is increased stepwise in an increment of the value of less than or equal to threshold Th stored in the storage 4 until a point corresponding to a pixel connected to point S by a link appears and step S2 becomes YES (step S3). At this time, for example, threshold Th stored in the storage 4 may be used, directly, as the value of increment for increasing the value of S link stepwise.

Then, as a result of repeating graph cut, when a point corresponding to a pixel connected to point S by a link appears and step S2 becomes YES, the region segmentation apparatus 1 ends graph cut processing there. The region segmentation apparatus 1 determines whether each pixel in the image to be divided belongs to the object region or the region other than the object region based on the result of the graph cut performed last (step S4), and ends processing.

The region segmentation apparatus, program and method of the present embodiment is configured as described. Therefore, it is possible to prevent a part of a background region having a probability distribution of pixel values similar to that of an object region from being erroneously separated as the object region when an image is divided into the object region and the other region, and to automatically separate the object region in a more accurate manner.

In the embodiment of the present invention, a case in which both of set value K of cost and threshold Th are stored in advance in the storage 4, and region segmentation processing is performed with reference to the stored values has been described. Alternatively, an input by a user specifying one or both of set value K of cost and threshold Th may be received, and region segmentation processing may be performed by using the input value or values. Here, setting of this parameter may be provided in such a manner that manual setting or automatic setting (in which a parameter is stored in the storage 4 in advance, and setting is performed with reference to the stored parameter) is selectable by selection of a menu.

Next, a second embodiment of a region segmentation apparatus, program and method of the present invention will be described. This second embodiment differs from the first embodiment only in a specific method for realizing region segmentation processing. The second embodiment is almost the same as the first embodiment in the other points. Therefore, explanation is omitted for the same points as those of the first embodiment. This embodiment corresponds to the second region segmentation apparatus, program and method of the present invention.

Figure 7:
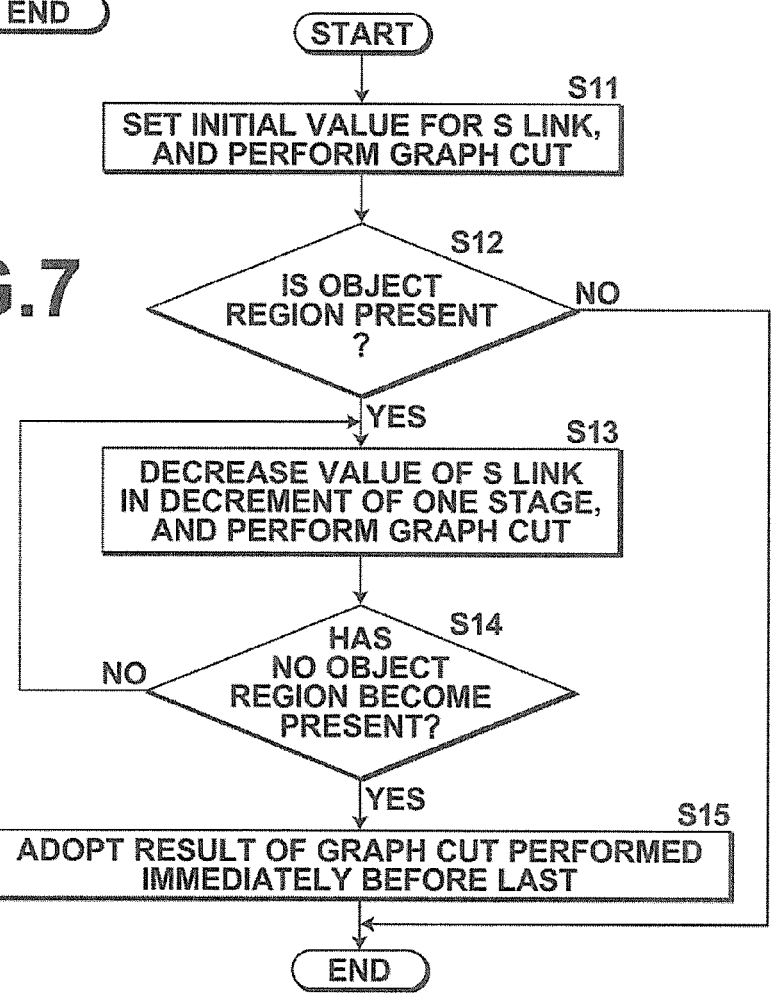
FIG. 7 is a flowchart showing a flow of region segmentation processing in a second embodiment.

FIG. 7 is a flowchart illustrating the outline of region segmentation processing in the embodiment of the present invention. In region segmentation processing, first, a graph including point S corresponding the object region, point T corresponding to the region other than the object region, a point corresponding to each of pixels in the image to be divided, an S link connecting a point corresponding to each of the pixels in the image to be divided and point S to each other, a T link connecting a point corresponding to each of the pixels in the image to be divided and point T to each other, and an N link connecting two points corresponding to each pair of adjacent pixels to each other is generated. Then, a cost is set for each of the S link, T link and N link, and graph cut is performed in such a manner to minimize the sum of costs set for links to be cut (step S11).

Then, the region segmentation apparatus 1 judges whether a point corresponding to a pixel connected to point S by a link is present in the graph after performance of graph cut on the graph (step S12). If the judgment judges that no point corresponding to a pixel connected to point S by a link is present (step S12: NO), processing ends there.

In contrast, if the judgment judges that a point corresponding to a pixel connected to point S by a link is present in step S12 (step S12: YES), graph cut is repeated while a cost that is set for all of S links connecting each point corresponding to each of pixels in the candidate region and point S is decreased stepwise in a decrement of the value of threshold Th stored in the storage 4 or less until each point corresponding to pixels connected to point S by links disappears and step S14 becomes YES (step S13). As a result of repeating graph cut, when each point corresponding to pixels connected to point S by links disappears, and step S14 becomes YES, the region segmentation apparatus ends graph cut processing there. The region segmentation apparatus determines whether each of the pixels in the image to be divided belongs to the object region or the region other than the object region based on a result of a graph cut performed immediately before the graph cut performed last (step S15), and ends processing.

The region segmentation apparatus, program and method of the present embodiment is configured as described. Therefore, it is possible to prevent a part of a background region having a probability distribution of pixel values similar to that of an object region from being erroneously separated as the object region when an image is divided into the object region and the other region, and to automatically separate the object region in a more accurate manner.

Next, a third embodiment of a region segmentation apparatus, program and method of the present invention will be described. This third embodiment differs from the first embodiment only in a specific method for realizing region segmentation processing. The third embodiment is almost the same as the first embodiment in the other points. Therefore, explanation is omitted for the same points as those of the first embodiment. This embodiment corresponds to the third region segmentation apparatus, program and method of the present invention.

FIG. 8 is a flowchart illustrating the outline of region segmentation processing in the embodiment of the present invention. In region segmentation processing, first, a graph including point S corresponding the object region, point T corresponding to the region other than the object region, a point corresponding to each of pixels in the image to be divided, an S link connecting a point corresponding to each of the pixels in the image to be divided and point S to each other, a T link connecting a point corresponding to each of the pixels in the image to be divided and point T to each other, and an N link connecting two points corresponding to each pair of adjacent pixels to each other is generated. Then, a cost is set for each of the S link, T link and N link, and graph cut is performed in such a manner to minimize the sum of costs set for links to be cut (S21).

Then, the region segmentation apparatus 1 judges whether a point corresponding to a pixel connected to point S by a link is present in a graph after performing graph cut (step S22). If the judgment judges that no point corresponding to one of the pixels connected to point S by a link is present (step S22: NO), graph cut is repeated while costs set for all the S links connecting points corresponding to pixels in the candidate region and point S to each other are increased stepwise in an increment of less than or equal to threshold Th stored in the storage 4 until a point corresponding to one of the pixels connected to point S by a link appears, and step S24 becomes YES (step S23). As a result of repeating graph cut, when a point corresponding to a pixel connected to point S by a link appears, and step S24 becomes YES, the region segmentation apparatus 1 ends graph cut processing there. The region segmentation apparatus 1 determines whether each of the pixels in the image to be divided belongs to the object region or the region other than the object region based on a result of the graph cut performed last (step S25), and ends processing.

In contrast, if the judgment judges that a point corresponding to a pixel connected to point S by a link is present in step S22 (step S22: YES), graph cut is repeated while a cost that is set for all of S links connecting each point corresponding to each of pixels in the candidate region and point S to each other is decreased stepwise in a decrement of the value of threshold Th stored in the storage 4 or less until each point corresponding to pixels connected to point S by links disappears and step S27 becomes YES (step S26). As a result of repeating graph cut, when each point corresponding to pixels connected to point S by links disappears, and step S27 becomes YES, the region segmentation apparatus ends graph cut processing there. The region segmentation apparatus determines whether each of the pixels in the image to be divided belongs to the object region or the region other than the object region based on a result of a graph cut performed immediately before the graph cut performed last (step S28), and ends processing.

The region segmentation apparatus, program and method of the present embodiment is configured as described. Therefore, it is possible to prevent a part of a background region having a probability distribution of pixel values similar to that of an object region from being erroneously separated as the object region when an image is divided into the object region and the other region, and to automatically separate the object region in a more accurate manner.

What is claimed is:

1. A region segmentation apparatus that divides an image into an object region and a region other than the object region, the apparatus comprising:
    a memory;
    a processor coupled to the memory and configured for:
    setting a candidate region for the object region in the image;
    setting a cost for each of an S link, a T link and an N link in a graph including a point S corresponding the object region, a point T corresponding to the region other than the object region, a point corresponding to each of pixels in the image, the S link connecting a point corresponding to each of the pixels and the point S to each other, the T link connecting a point corresponding to each of the pixels and the point T to each other, and the N link connecting two points corresponding to each pair of adjacent pixels to each other, and performing a graph cut that minimizes the sum of costs set for links to be cut, and judging whether a point corresponding to one of the pixels connected to the point S by a link is present in the graph after performance of graph cut, and if no point is present, performing the graph cut in another graph cut while costs set for all the S links connecting points corresponding to pixels in the candidate region and the point S to each other are increased stepwise in an increment of less than or equal to a predetermined threshold until a point corresponding to one of the pixels connected to the point S by a link appears, and determining whether each of the pixels in the image belongs to the object region or the region other than the object region based on a result of a graph cut performed last; and
    dividing the image corresponding to the result of the graph cut performed last.

2. A region segmentation apparatus that divides an image into an object region and a region other than the object region, the apparatus comprising:
    a memory;
    a processor coupled to the memory and configured for:
    setting a candidate region for the object region in the image;
    setting a cost for each of an S link, a T link and an N link in a graph including a point S corresponding the object region, a point T corresponding to the region other than the object region, a point corresponding to each of pixels in the image, the S link connecting a point corresponding to each of the pixels and the point S to each other, the T link connecting a point corresponding to each of the pixels and the point T to each other, and the N link connecting two points corresponding to each pair of adjacent pixels to each other, and performing a graph cut that minimizes the sum of costs set for links to be cut, and judging whether a point corresponding to one of the pixels connected to the point S by a link is present in the graph after performance of graph cut, and if the point is present, performing the graph cut in another graph cut while costs set for all the S links connecting points corresponding to pixels in the candidate region and the point S to each other are decreased stepwise in a decrement of less than or equal to a predetermined threshold until each point corresponding to the pixels connected to the point S by links disappears, and determining whether each of the pixels in the image belongs to the object region or the region other than the object region based on a result of a graph cut performed immediately before a graph cut performed last; and dividing the image corresponding to the result of the graph cut performed last.

3. A region segmentation apparatus that divides an image into an object region and a region other than the object region, the apparatus comprising:

a memory;

a processor coupled to the memory and configured for:

setting a candidate region for the object region in the image;

setting a cost for each of an S link, a T link and an N link in a graph including a point S corresponding the object region, a point T corresponding to the region other than the object region, a point corresponding to each of pixels in the image, the S link connecting a point corresponding to each of the pixels and the point S to each other, the T link connecting a point corresponding to each of the pixels and the point T to each other, and the N link connecting two points corresponding to each pair of adjacent pixels to each other, and performing a graph cut that minimizes the sum of costs set for links to be cut, and judging whether a point corresponding to one of the pixels connected to the point S by a link is present in the graph after performance of graph cut, and if the judgment judges that no point corresponding to one of the pixels connected to the point S by a link is present, performing the graph cut in another graph cut while costs set for all the S links connecting points corresponding to pixels in the candidate region and the point S to each other are increased stepwise in an increment of less than or equal to a predetermined threshold until a point corresponding to one of the pixels connected to the point S by a link appears, and determining whether each of the pixels in the image belongs to the object region or the region other than the object region based on a result of a graph cut performed last, but if the judgment judging that the point corresponding to one of the pixels connected to the point S by a link is present, performing the graph cut in another graph cut while costs set for all the S links connecting points corresponding to pixels in the candidate region and the point S to each other are decreased stepwise in a decrement of less than or equal to a predetermined threshold until each point corresponding to the pixels connected to the point S by links disappears, and determining whether each of the pixels in the image belongs to the object region or the region other than the object region based on a result of a graph cut performed immediately before a graph cut performed last; and dividing the image corresponding to the result of the graph cut performed last.

4. The region segmentation apparatus, as defined in claim 1, wherein setting the candidate region comprises obtaining a distribution of pixel values for the whole image or a part of the image including the object region, and determining a range of pixel values by analyzing the obtained distribution of pixel values, and setting, as the candidate region, a set of pixels having pixel values within the determined range of pixel values.

5. The region segmentation apparatus, as defined in claim 2, wherein setting the candidate region comprises obtaining a distribution of pixel values for the whole image or a part of the image including the object region, and determining a range of pixel values by analyzing the obtained distribution of pixel values, and setting, as the candidate region, a set of pixels having pixel values within the determined range of pixel values.

6. The region segmentation apparatus, as defined in claim 3, wherein setting the candidate region comprises obtaining a distribution of pixel values for the whole image or a part of the image including the object region, and determining a range of pixel values by analyzing the obtained distribution of pixel values, and setting, as the candidate region, a set of pixels having pixel values within the determined range of pixel values.

7. The region segmentation apparatus, as defined in claim 1, the apparatus comprising:

a pixel value range storage unit that stores a predetermined range of pixel values, wherein setting the candidate region comprises setting a set of pixels having pixel values within the range of pixel values stored in the pixel value range storage unit.

8. The region segmentation apparatus, as defined in claim 2, the apparatus comprising:

a pixel value range storage unit that stores a predetermined range of pixel values, wherein setting the candidate region, comprises setting a set of pixels having pixel values within the range of pixel values stored in the pixel value range storage unit.

9. The region segmentation apparatus, as defined in claim 3, the apparatus comprising:

a pixel value range storage unit that stores a predetermined range of pixel values, wherein setting the candidate region comprises setting a set of pixels having pixel values within the range of pixel values stored in the pixel value range storage unit.

10. The region segmentation apparatus, as defined in claim 1, the apparatus comprising:

a set value storage unit that stores a predetermined set value of cost, wherein the set value stored in the set value storage unit is used as an initial value of cost that is set for all the S links connecting points corresponding to pixels in the candidate region and the point S to each other.

11. The region segmentation apparatus, as defined in any claim 2, the apparatus comprising:

a set value storage unit that stores a predetermined set value of cost, wherein the set value stored in the set value storage unit is used as an initial value of cost that is set for all the S links connecting points corresponding to pixels in the candidate region and the point S to each other.

12. The region segmentation apparatus, as defined in any claim 3, the apparatus comprising:

a set value storage unit that stores a predetermined set value of cost, wherein the set value stored in the set value storage unit is used as an initial value of cost that is set for all the S links connecting points corresponding to pixels in the candidate region and the point S to each other.

13. The region segmentation apparatus, as defined in claim 1, the apparatus comprising:

a threshold storage unit that stores the predetermined threshold, wherein the increment is determined by using the threshold stored in the threshold storage unit.

14. The region segmentation apparatus, as defined in claim 2, the apparatus comprising:

a threshold storage unit that stores the predetermined threshold, wherein the decrement is determined by using the threshold stored in the threshold storage unit.

15. The region segmentation apparatus, as defined in claim 3, the apparatus comprising:

a threshold storage unit that stores the predetermined threshold, wherein the increment and the decrement is determined by using the threshold stored in the threshold storage unit.

16. A non-transitory recording medium having stored therein a region segmentation program that divides an image into an object region and a region other than the object region, the program causing one or plural computers to perform:

setting a candidate region for the object region in the image;

setting a cost for each of an S link, a T link and an N link in a graph including a point S corresponding the object region, a point T corresponding to the region other than the object region, a point corresponding to each of pixels in the image, the S link connecting a point corresponding to each of the pixels and the point S to each other, the T link connecting a point corresponding to each of the pixels and the point T to each other, and the N link connecting two points corresponding to each pair of adjacent pixels to each other, and performing a graph cut that minimizes the sum of costs set for links to be cut, and judging whether a point corresponding to one of the pixels connected to the point S by a link is present in the graph after performance of graph cut, and if no point is present, performing the graph cut in another graph cut while costs set for all the S links connecting points corresponding to pixels in the candidate region and the point S to each other are increased stepwise in an increment of less than or equal to a predetermined threshold until a point corresponding to one of the pixels connected to the point S by a link appears, and determining whether each of the pixels in the image belongs to the object region or the region other than the object region based on a result of a graph cut performed last; and dividing the image corresponding to the result of the graph cut performed last.

17. A non-transitory recording medium having stored therein a region segmentation program that divides an image into an object region and a region other than the object region, the program causing one or plural computers to perform:

setting a candidate region for the object region in the image;

setting a cost for each of an S link, a T link and an N link in a graph including a point S corresponding the object region, a point T corresponding to the region other than the object region, a point corresponding to each of pixels in the image, the S link connecting a point corresponding to each of the pixels and the point S to each other, the T link connecting a point corresponding to each of the pixels and the point T to each other, and the N link connecting two points corresponding to each pair of adjacent pixels to each other, and performing a graph cut that minimizes the sum of costs set for links to be cut, and judging whether a point corresponding to one of the pixels connected to the point S by a link is present in the graph after performance of graph cut, and if the point is present, performing the graph cut in another graph cut while costs set for all the S links connecting points corresponding to pixels in the candidate region set by the candidate region setting unit and the point S to each other are decreased stepwise in a decrement of less than or equal to a predetermined threshold until each point corresponding to the pixels connected to the point S by links disappears, and determining whether each of the pixels in the image belongs to the object region or the region other than the object region based on a result of a graph cut performed immediately before a graph cut performed last; and dividing the image corresponding to the result of the graph cut performed last.

18. A non-transitory recording medium having stored therein a region segmentation program that divides an image into an object region and a region other than the object region, the program causing one or plural computers to perform:

setting a candidate region for the object region in the image;

setting a cost for each of an S link, a T link and an N link in a graph including a point S corresponding the object region, a point T corresponding to the region other than the object region, a point corresponding to each of pixels in the image, the S link connecting a point corresponding to each of the pixels and the point S to each other, the T link connecting a point corresponding to each of the pixels and the point T to each other, and the N link connecting two points corresponding to each pair of adjacent pixels to each other, and performing a graph cut that minimizes the sum of costs set for links to be cut, and judging whether a point corresponding to one of the pixels connected to the point S by a link is present in the graph after performance of graph cut, and if the judgment judges that no point corresponding to one of the pixels connected to the point S by a link is present, performing the graph cut in another graph cut while costs set for all the S links connecting points corresponding to pixels in the candidate region set by the candidate region setting unit and the point S to each other are increased stepwise in an increment of less than or equal to a predetermined threshold until a point corresponding to one of the pixels connected to the point S by a link appears, and determining whether each of the pixels in the image belongs to the object region or the region other than the object region based on a result of a graph cut performed last, but if the judgment judges that the point corresponding to one of the pixels connected to the point S by a link is present, performing the graph cut in another graph cut while costs set for all the S links connecting points corresponding to pixels in the candidate region and the point S to each other are decreased stepwise in a decrement of less than or equal to a predetermined threshold until each point corresponding to the pixels connected to the point S by links disappears, and determining whether each of the pixels in the image belongs to the object region or the region other than the object region based on a result of a graph cut performed immediately before a graph cut performed last; and dividing the image corresponding to the result of the graph cut performed last.

19. The region segmentation apparatus, as defined in claim 1, the apparatus further comprises displaying the divided image corresponding to the result of the graph cut performed last.

20. The region segmentation apparatus, as defined in claim 2, the apparatus further comprises displaying the divided image corresponding to the result of the graph cut performed last.

21. The region segmentation apparatus, as defined in claim 3, the apparatus further comprises displaying the divided image corresponding to the result of the graph cut performed last.

* * * * *